May 3, 1932.     G. E. LUCE     1,856,574
ALIGNING DEVICE
Original Filed Oct. 19, 1929
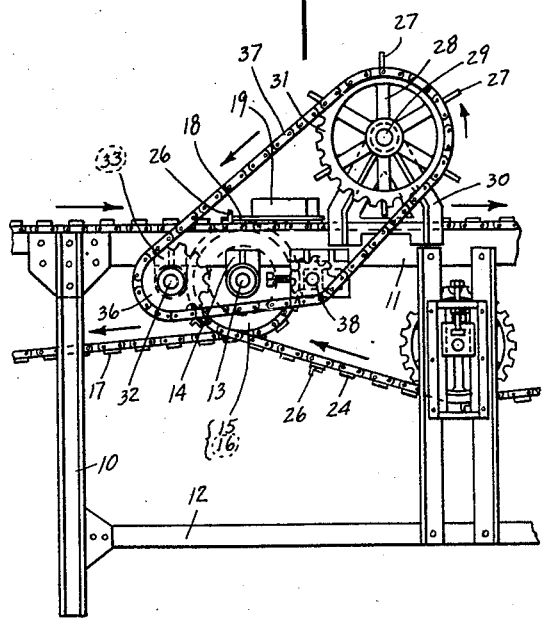
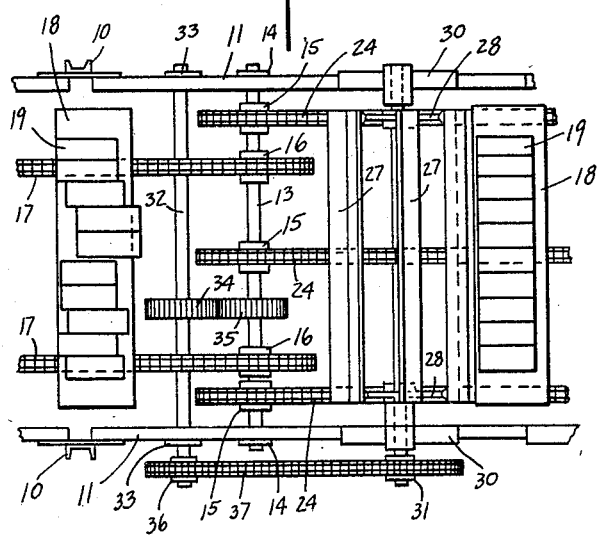
INVENTOR.
GRAFTON E. LUCE.
BY
Lockwood Lockwood Goldsmith & Galt
ATTORNEYS.

Patented May 3, 1932

1,856,574

UNITED STATES PATENT OFFICE

GRAFTON E. LUCE, OF CHICAGO, ILLINOIS, ASSIGNOR TO LANCASTER IRON WORKS, INC., OF LANCASTER, PENNSYLVANIA, A CORPORATION

ALIGNING DEVICE

Original application filed October 19, 1929, Serial No. 400,835. Divided and this application filed April 13, 1931. Serial No. 529,756.

This invention relates to an aligning device adapted to receive a plurality of articles irregularly placed upon a pallet or similar support in turn being transported upon a conveyor and to align said articles upon said pallet in a predetermined relationship during transit. This application is a division of application Serial No. 400,835, filed October 19, 1929, which is in turn a continuation in part of application Serial No. 237,191, filed December 2, 1927, the latter application having resulted in Patent No. 1,746,664 issued February 11, 1930.

In the manufacture of brick by the so-called soft mud process, the brick are formed in a mold and placed in the soft condition on steel pallets with their largest surface in contact with the pallet. The brick are then dried without being removed from the pallet. In the mechanical handling of brick between the drier and the kiln, the pallets carrying the brick are transported from the drier by a chain conveyor. The pallets are accurately positioned upon the conveyor and the brick accurately centered upon the pallets by means of a centering device which is the subject of prior patent of Grafton E. Luce and Thomas B. Huestis, No. 1,820,471, issued August 25, 1931. The pallets and brick are then delivered to the aligning device which is hereinafter described and by means of which the brick are aligned in the proper position upon the pallet to be acted upon by the edging machine which forms the subject matter of application Serial No. 400,835 mentioned above. By means thereof the brick on the pallet are turned up on edge and grouped in the proper relation for further handling. From the edging machine the brick are conveyed to a hacking machine of the general type disclosed in Patent No. 1,627,656, issued to Grafton E. Luce May 10, 1927. The hacking machine removes the brick from the pallet and stacks them in a unit stack on a kiln car in the proper relation for burning. The car and brick are then transported to the kiln shed and the brick are set in place for burning by means of a brick setter of the general type disclosed in Patent No. 1,205,562, issued to R. C. Penfield November 21, 1916, and Patent No. 1,712,773, issued to Grafton E. Luce May 14, 1929.

The object of the present invention is to provide apparatus which aligns the brick on the pallet in a line transverse to the line of travel thereof and in the proper position to be engaged by the edging machine. The said apparatus is of course equally useful in aligning other articles upon a conveyor for other purposes than that herein disclosed.

The specific features of the invention by which this object is attained will be apparent from the accompanying drawings and the following description and claims:

Figure 1 is an elevational view of the apparatus and Figure 2 is a plan view thereof.

A framework for supporting the machine is provided and includes a plurality of vertical columns 10, horizontal beams 11 supported upon the upper ends thereof, horizontal members 12 attached adjacent the lower ends of the said columns and suitable cross bracing between the columns 10 and between the members 11 not shown in the drawings. A horizontal shaft 13 is supported upon bearings 14 in turn supported upon the frame members 11 and carries three sprockets 15 and two sprockets 16. A pair of conveyor chains 17 are trained about the sprockets 16 and are adapted to deliver the pallets 18 carrying brick 19 from the centering device previously mentioned to the aligning device. Three conveyor chains 24 are trained about the sprockets 15 and other suitable sprockets not shown. The said chains receive the pallets from the chains 17 and convey the same to the edging machine. They may be driven by any suitable means such as an electric motor. The sprockets 15 and 16 are all keyed to shaft 13 so that movement of chains 24 produces a like movement of chains 17.

Each of the outer conveyor chains 24 carries a plurality of attachments 26 which project upwardly into the path of travel of the pallet. When discharged from the centering device which is the subject of the beforementioned Patent No. 1,820,471, the pallets have been accurately centered upon the conveyor chains 17, and the brick have been centered upon the pallet and positioned with their edges in contact. The forward and rear edges of adjacent brick, however, have not been aligned with each other. The brick, therefore, may be in the relation illustrated in the left of Figure 2. As described in the before-mentioned issued patent, the pallets are released from the centering device in timed relation with the travel of the conveyor 17. This relation is such that the pallets reach the conveyor chains 24 at the proper time to position each pallet immediately ahead of a pair of the attachments 26.

For aligning the forward edges of the brick, an aligning wheel is provided consisting of horizontally disposed angle members 27 supported upon spiders 28 in turn fixedly carried upon a shaft 29. The shaft 29 is supported upon A-frames 30 carried upon the frame members 11. A sprocket 31 is carried upon one end of the shaft 29. A shaft 32 is supported upon bearings 33 carried upon the frame members 11 and is rotated by means of a pair of spur gears 34 and 35 carried upon the said shaft and upon the shaft 13 respectively. A sprocket 36 is carried upon the shaft 32 and a sprocket chain 37 is trained about the said sprocket and the sprocket 31. A takeup 38 is provided for taking up wear in the sprocket chains 37.

By means of this construction, the aligning wheel is rotated in the direction indicated by an arrow in Figure 1. The ratio of the gears 34 and 35 and the various sprocket sizes are selected to drive the outer edges of the horizontal members 27 of the aligning wheel at a speed slightly slower than the speed of the conveyor chains 24. Each of the members 27 is timed to reach its lowermost position at the proper time to engage the front edge of the brick carried upon a pallet. Since the members 27 are travelling at a slower speed than the chains 24, this engagement results in sliding the brick back on the pallet and sliding the pallet backward upon the chain until the pallet strikes the attachment 26. In the further travel of the pallet and the members 27, the said members are elevated from the path of the brick leaving the brick aligned upon the pallet with their rear edges substantially in line with the rear edges of the pallet and leaving the front edge of the pallet clear. The final position of the brick upon the pallet is shown by pallet 18 and brick 19 at the right in Figure 2. In this position they may be acted upon by the edging machine as described in the before-mentioned application, Serial No. 400,835.

The invention claimed is:

1. The combination of a conveyor adapted to transport a plurality of pallets each having a plurality of brick thereon, a movable member movable through a portion of its travel in the path of travel of said brick, said movement being at a slower rate of speed than the movement of said conveyor whereby engagement of said brick with said movable member repositions said brick relatively of said pallet, and means on said conveyor for preventing relative movement between said pallets and conveyor during said engagement.

2. The combination of a conveyor adapted to transport a plurality of pallets in a predetermined spaced relation, each pallet having a plurality of brick thereon, and an aligning wheel operable in timed relation with the travel of said conveyor and having members thereon adapted to engage the front edges of said brick for moving the brick to the rear of the pallet and simultaneously aligning the same transversely to the line of travel.

3. The combination of a conveyor adapted to transport a plurality of pallets each having a plurality of brick thereon, attachments on said conveyor adapted to serve as abutments for said pallets, a rotatable aligning wheel having members thereon movable through a portion of their travel in the path of travel of said brick, and mechanism for rotating said wheel to move said members in timed relation to the movement of said conveyor and at a speed slower than said conveyor movement whereby each of said members engages the front edges of the brick on one of said pallets to retard the movement of brick and pallet until the pallet is engaged by one of said attachments and thereafter to retard the movement of the brick alone until the same are aligned upon said pallet.

In witness whereof, I have hereunto affixed my signature.

GRAFTON E. LUCE.